United States Patent
Chao et al.

(10) Patent No.: US 6,295,171 B1
(45) Date of Patent: Sep. 25, 2001

(54) PIEZOELECTRIC LIGHT BEAM DEFLECTOR

(75) Inventors: Yong-Sheng Chao, Storrs, CT (US); Ying Zhao, New York, NY (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 0 days.

(21) Appl. No.: 09/737,506

(22) Filed: Dec. 15, 2000

Related U.S. Application Data (63) Continuation-in-part of application No. 09/503,828, filed on Feb. 15, 2000, now Pat. No. 6,204,955, which is a continuation-in-part of application No. 09/350,388, filed on Jul. 9, 1999, now abandoned.

(51) Int. Cl.[7] .............................. G02B 7/02; G02B 26/08
(52) U.S. Cl. ......................... 359/813; 359/824; 359/298
(58) Field of Search .................................. 359/813, 814, 359/824, 298, 318, 209, 210

(56) References Cited

U.S. PATENT DOCUMENTS

| | | |
|---|---|---|
| 4,836,629 | 6/1989 | Huignard et al. . |
| 5,526,168 | 6/1996 | Parl . |
| 5,917,647 * | 6/1999 | Yoon ..................... 359/298 |
| 5,920,662 | 7/1999 | Hinkov . |
| 6,144,478 * | 11/2000 | Nowak et al. ........... 359/210 |
| 6,204,955 * | 3/2001 | Chao et al. ............. 359/298 |
| 6,222,302 * | 4/2001 | Imada et al. ........... 310/321 |

OTHER PUBLICATIONS

L.Y. Lin et al., Free–Space Micromachined Optical Switches for Optical Networking, IEEE Journal of Selected Topics in Quantum Electronics, vol. 5, No. 1 Jan./Feb. 1999, p. 4–9.
Glöckner et al., Micro–opto–mechanical Beam Deflectors, Optical Engineering, vol. 36(5), May 1997, p. 1339–1345.

* cited by examiner

Primary Examiner—Georgia Epps
Assistant Examiner—Saeed Seyrafi
(74) Attorney, Agent, or Firm—Morse, Altman & Martin (57) ABSTRACT

A light beam deflector comprises an initial beam deflector that imparts a small initial deflection, and a beam deflection amplifier that increases the initial small deflection by a multiplication factor. There are five embodiments of the initial beam deflector. The first four use a pair of lenses and a piezoelectric actuator affixed to one lens. When the parallel lens axes are separated by a distance, the incident light beam will be deflected by a small angle, typically up to about 5°. The fifth embodiment comprises a mirror affixed to a piezoelectric actuator, which tilts the mirror. The beam deflection amplifier has five embodiments. The first is a Keplerian telescope lens first stage and a negative lens system second stage. The first is a Galilean telescope lens first stage and a negative lens system second stage. The third embodiment is either a Keplerian or Galilean telescope lens alone. The fourth embodiment replaces the single second lens of the first stage with a compound lens system. The fifth embodiment uses a special sphere lens alone.

12 Claims, 7 Drawing Sheets

PIEZOELECTRIC LIGHT BEAM DEFLECTOR

RELATED APPLICATIONS

The present application is a continuation-in-part application of application Ser. No. 09/503,828, dated Feb. 15, 2000, which is now U.S. Pat. No. 6,204,955, for APPARATUS FOR DYNAMIC CONTROL OF LIGHT DIRECTION IN A BROAD FIELD OF VIEW in the names of Yong-Sheng Chao and Ying Zhao, which is a continuation-in-part application of application Ser. No. 09/350,388, dated Jul. 9, 1999, which is now abandoned for APPARATUS FOR DYNAMIC CONTROL OF LIGHT DIRECTION IN A BROAD FIELD OF VIEW in the names of Yong-Sheng Chao and Ying Zhao.

BACKGROUND OF THE INVENTION

1. Field of the Invention

This invention relates generally to light direction control, and more particularly, to techniques for the dynamic control of light propagation direction.

2. The Prior Art

Dynamic control of light beam propagation direction is a fundamental technique in optics. Direct applications include projection displays, entertainment, advertisement, laser printers, laser detection systems, laser scanning, optical communications, laser machining, etc. Electromechanical devices have been the most frequently used light scanners in commercial products. Electromechanical methods use a rotating reflector or a rotating refractor driven by an electromechanical mechanism for changing light direction. The most important limitations of the electromechanical scanner include slow speed, bulky size, and the deficiencies inherent in complex electromechanical mechanisms. These limitations are intrinsic due to the nature of mechanical movement at a macro-dimensional scale.

Piezo-electric devices are able to induce small geometric changes on a sub-millimeter scale. Note that there is a significant difference between the macro-dimensional scale and the sub-millimeter scale. These difference extend beyond merely size; they represent different principles of operation and different methods of fabrication. When an electric signal is appropriately applied on a piezoelectric material, such as PZT (Lead Zirconate Titanite), a small dimensional change is induced. The dimensional change is generally in the range of from 1 micrometer ($\mu$m) to 500 $\mu$m. Piezoelectric actuators are based on such sub-millimeter scale processes. The most notable features of the sub-millimeter scale devices include high speed, miniature size, and simple device structure.

In the prior art, there are two types of piezoelectric light beam deflectors, the simple type and the mechanically enhanced type. Simple piezoelectric light deflectors can produce a small deflection angle ranging from 0.01° to several degrees. They are essentially piezoelectric light deflectors without enhancement. Since the deflection angles produced by the simple piezoelectric deflectors are too small for many practical applications, U.S. Pat. Nos. 3,981,566 and 4,025,203 and other prior art publications disclose mechanically enhanced piezoelectric mechanisms. Mechanically enhanced devices further extended the deflection angle to as large as about 15°. However, mechanically enhanced devices suffer from reduced speed and very delicate mechanical mechanisms at the macro-dimensional scale. The deficiencies of the mechanically enhanced piezoelectric light deflectors are on par with those of other electromechanical devices, while sacrificing the unique advantages of the simple piezoelectric process. Mechanically enhanced piezoelectric light deflectors have proved incapable of competing with other conventional electromechanical light deflectors for commercial applications.

SUMMARY OF THE INVENTION

An object of the present invention is to provide a geometric optical lens system capable of providing a large output deflection angle for dynamic control of light beam direction.

Another object is to provide a dynamic light beam deflector based on the use of simple piezoelectric actuators. Such a deflector provides a large deflection angle with a simple structure characteristic of piezoelectric devices. The present system eliminates deficiencies associated with macro-electromechanical devices.

The light beam deflector of the present invention comprises an initial dynamic beam deflector, which imparts a small initial deflection $\theta_0$, and a beam deflection amplifier, which increases the initial small deflection $\theta_0$ to an output deflection $\theta$. The light beam deflector is for use with a light source, such as a laser, light-emitting diode, or optical fiber, and conventional optics to appropriately modify the light output to meet the requirements of the initial beam deflector.

The initial beam deflector employs a piezoelectric actuator to control the amount of deflection in several embodiments. The first embodiment comprises a pair of positive geometric optical lenses with parallel axes and a piezoelectric actuator. The lenses are separated by a distance equal to the sum of their focal lengths $f_1+f_2$. The actuator is affixed to one lens such that the actuator can move the lens, either one- or two-dimensionally, in a plane parallel to the other lens. When the lens axes are separated by a distance d, the incident light beam will be deflected by an angle $\theta_0=d/f_2$. The angle $\theta_0$ can typically range up to about 5°.

The second embodiment of the initial deflector is essentially the same as the first embodiment except that a mirror is placed close to the back surface of the second lens. With this arrangement, the deflection angle $\theta_0=2d/f_1$.

The third embodiment is essentially the same as the first embodiment except that the positive second lens is replaced by a negative lens. Because the focal length of the second lens is less than zero, the distance between the lenses is $f_1-|f_2|$. The initial deflection angle $\theta_0=d/f_{2N}$. One characteristic of the third embodiment is that there exists no real focal point of the light beam. This may be advantageous if the power of the light beam is extremely high.

The fourth embodiment of the initial deflector is essentially the same as the third embodiment except that a mirror is placed close to the back surface of the negative lens. With this arrangement, the deflection angle $\theta_0=2d/f_2$.

The fifth embodiment of the initial beam deflector comprises a mirror rigidly affixed to a piezoelectric actuator, which tilts the mirror, producing a change in the orientation of the mirror.

The beam deflection amplifier multiplies the initial deflection angle $\theta_0$ by an amplification factor A to result in a full deflection angle $\theta_0 A=\theta$, where A>1. There are five preferred embodiments. The first embodiment comprises a Keplerian telescope lens system first stage and a negative lens system second stage. The most important criteria for achieving a large output deflection angle is to make sure that the first stage output light beam always angles away from the optical axis after crossing the optical axis between the two stages.

The second embodiment comprises a Galilean telescope lens system first stage and a negative lens system second stage. The most important criteria for achieving a large output deflection angle is to make sure that the first stage output light beam always angles away from the optical axis, without crossing the optical axis between the two stages.

The third embodiment uses a standard telescope lens system alone, either a Keplerian and Galilean telescope lens systems. They both comprise two lenses with different focal lengths where the amplification factor is basically determined by the ratio of the focal length of the two lenses.

The fourth embodiment replaces the single second lens of the first stage with a compound lens system. Examples of such compound systems include the Huigenian, Ramsden, Kellner, RKE, Orthoscopic, Plossl, and Erfle eyepieces.

The fifth embodiment is the lens system as disclosed in the U.S. Pat. application Ser. No. 09/503,828, which can provide an output deflection angle approaching ±90°.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE PREFERRED EMBODIMENTS

Figure 1:
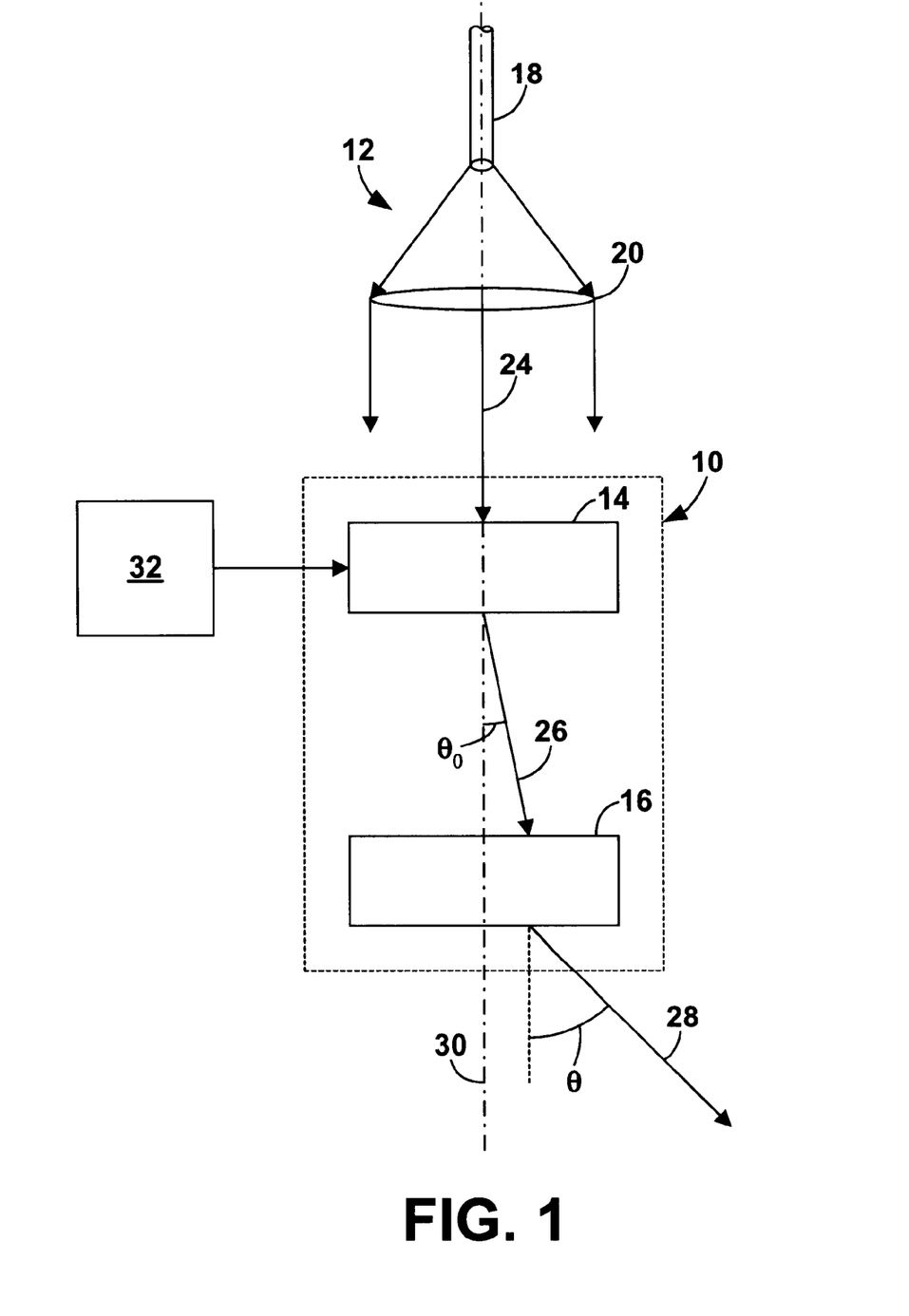
FIG. 1 is a block diagram of the basic apparatus of the present invention.

The basic light beam deflector 10 of the present invention, a block version of which is shown in FIG. 1, comprises an initial dynamic beam deflector 14 and a beam deflection amplifier 16 based on classical geometric optics that provides an output light beam with an increased deflection angle. In the remainder of this specification, the beam deflection amplifier 16 based on classical geometric optics is denoted simply as the "beam deflection amplifier" or simply "deflection amplifier."

The present invention 10 is intended for use with a light source 12 that comprises a light emitting device 18, such as a laser, light-emitting diode, lamp, or optical fiber as a light source, and a conventional optical system 20 to appropriately modify the light emitting device output to meet the specific requirements of the initial beam deflector 14 for optimal performance, as discussed below. The techniques used in the light source 12 are standard and well-established.

The beam 24 from the light source 12 passes through the initial beam deflector 14, undergoing a small initial deflection $\theta_0$, as measured between the light beam direction and the optical axis 30 of the system. The initial beam deflector 14 is controlled by an external device 23. The initially deflected beam 26 then passes through the deflection amplifier 16, which increases the initial small deflection $\theta_0$ to an output deflection $\theta$, as measured between the direction of the output light beam 28 and the optical axis 30 of the system.

The Initial Beam Deflector 14

The initial beam deflector 14 of the present invention employs a piezoelectric actuator to control the amount of deflection. The piezoelectric actuator is incorporated in to several preferred embodiments of the initial beam deflector 14.

1. First Initial Beam Deflector Embodiment

Figure 2:
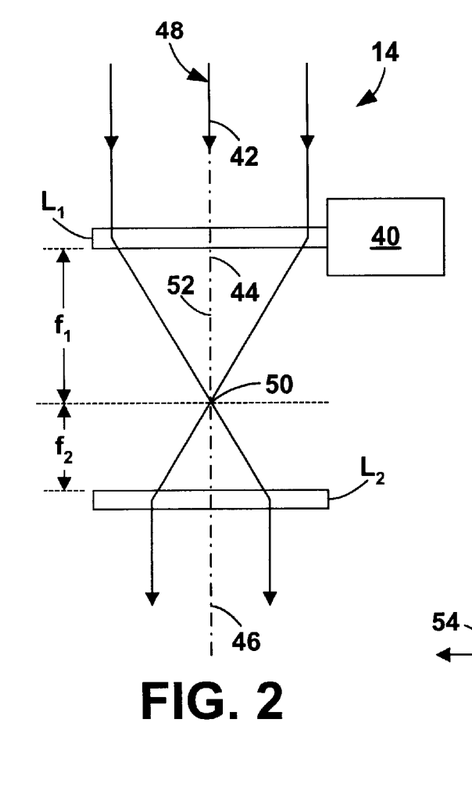
FIG. 2 is a schematic diagram of the first embodiment of the initial beam deflector in its non-deflecting state.

The first embodiment of the initial beam deflector 14 comprises a pair of geometric optical lenses $L_1$, $L_2$ and a piezoelectric actuator 40, shown schematically in FIG. 2. The active optical component is the lens pair $L_1$, $L_2$. One of the lenses $L_1$ is rigidly affixed to the actuator 40 such that the actuator can move lens $L_1$ in a plane parallel to the other lens $L_2$. The movement may be one-dimensional or two-dimensional, depending upon the requirements of the system within which the apparatus of the present invention is incorporated.

A piezoelectric actuator is a device that changes a physical dimension when an electric signal is applied. They are constructed to provide a driving force to an object so that the object can change its position or change its orientation in space. The three independent position coordinate parameters and the three independent orientation coordinate parameters of the driven object can be changed either individually or in combination. The driving force is generally very strong, ranging from 1 to 10,000 Newtons. The size of the dimensional change is quantitatively related to the voltage of the electric signal. When a reasonably high voltage is applied to a present technology piezoelectric actuator, the displacement produced by the actuator can be in the range of between 10 $\mu$m to as large as 500 $\mu$m. The piezoelectric actuator is designed to work either in a high voltage mode (1,000 V) or a low voltage mode (100 V), either of which can provide the desired displacement. The high voltage mode has the advantage of higher speed and is suitable for working with discrete semiconductor devices such as IGBTs, etc. The low voltage mode has the advantage of being compatible with certain commercial CMOS integrated circuit devices constructed in a compact large array form.

Figure 3:
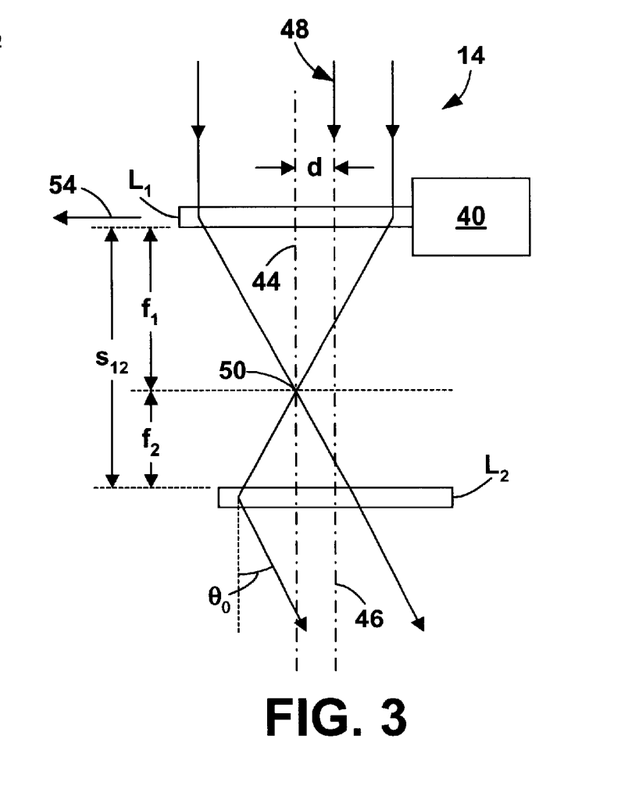
FIG. 3 is a schematic diagram of the initial beam deflector of FIG. 2 in a deflecting state.

The initial deflector 14 comprises a first focusing lens $L_1$ with a focal length $f_1$, a second focusing lens $L_2$ with a focal length $f_2$, and a piezoelectric actuator 40, where one of the lenses $L_1$, $L_2$ is rigidly bonded to the piezoelectric actuator 40. When the central symmetric axes 44, 46 of the two lenses coincide with the optical axis 42 of a collimated light beam 48, the light beam 48 is focused at a focal point 50 on the optical axis 52 of the system. As shown in FIG. 3, when the actuator 40 moves lens $L_1$, as at 54, such that the symmetric axis 44 of lens $L_1$ deviates slightly from the light beam axis 42 by a distance d, the position of its focal point 50 is shifted by the same distance d. If lens $L_2$ is at a distance $s_{12}=f_1+f_2$ from lens $L_1$ and its central axis 46 remains coincident with the light beam axis 42, then the light beam becomes collimated again after passing through lens $L_2$, but will propagate with a deflection angle $\theta_0=d/f_2$. Assuming that the focal length $f_2=2$ mm and that the displacement d of lens $L_1$ axis 44 from the light beam axis 42 is d=100 μm, the initial deflection angle will be $\theta_0=d/f_2=100/2,000=1/20$ radians $\approx 3°$. This is but one of a range of initial deflection angle values, which can typically range up to about 5°.

If the light beam axis 42 is denoted as the z axis, the axis across the drawing sheet as the X axis, and the axis into the drawing sheet as the Y axis, then a piezoelectric actuator 40 can move lens $L_1$ two-dimensionally in the XY plane by an appropriate amount x,y. This will correspond to a light beam deflection angle of $\theta_0$ in the XZ plane and a light beam deflection angle of $\phi_0$ in the YZ plane.

Note that piezoelectric actuators are usually categorized as electromechanical devices. However, in the present invention, piezoelectric actuators can be designed such that they differ significantly from other conventional electromechanical devices. First, the piezoelectric actuators to be used in the present application can be made extraordinarily robust so that they have an extraordinarily long service life, to the point where it can be presumed that they will outlast the usable life of the switching system of which it is a part. The reason is that when the lens and actuator are rigidly bonded together, the actuator-lens system actually becomes a single object. When the electrical signal is applied or the signal amplitude is changed, a displacement of the lens-actuator object is produced without producing mechanical friction in the entire system. This is a significant difference between conventional electromechanical light beam deflectors and piezoelectric actuators. According to experimental data, the service lifetime of presently available piezoelectric actuators can be billions of operations.

Secondly, the piezoelectric actuators to be used in the present application can be made with very fast response times. According to experimental data, as long as the size of the actuator is sufficiently small, the response time can be measured in microseconds.

Note that the present invention contemplates several trivial variations to this first embodiment. One variation is to bond the actuator 14 to lens $L_2$, rather than lens $L_1$, providing an equivalent displacement to lens $L_2$.

The prior art describes the use of micro-lens arrays and micro-prism arrays driven by a piezoelectric actuator for changing light beam direction. S. Glockner et al., *Micro-opto-mechanical Beam Deflector*, Optical Engineering, vol. 36(5) p. 1339. A micro-lens is generally defined as a lens having an aperture between approximately 10 μm and 500 μm. It is generally known that a single micro-lens is not adequate for focusing a light beam or collimating in a high performance system, because of the well-known diffraction limitations. The diffraction causes the light beam to have an angular divergence value $\Delta=1.22\lambda/D$, where $\lambda$ is the wavelength of the light beam, D is the diameter, or aperture, of the lens. When $\lambda=1$ μm and D=100 μm, the diffraction-produced beam divergence angle $\Delta=1/100$ radians =10 milliradians= 0.6° is rather large for the mircolenses. In view of this fact, Glockner et al. uses a microlens array to get around the diffraction problem. A microlens array is a matrix of n×m lenses fabricated on a single substrate, where n and m typically range from 5 to 1,000. In Glockner's method, the entire array of n×m lenses work cooperatively to receive and transmit a single coherent light beam. Because each microlens has a very small focal length, which is comparable to the displacement of the piezoelectric actuator, the light beam deflection can be appropriately large. Glockner's methods are essentially different from the method of the present invention for several reasons. (a) Glockner's methods use a microlens array, while the present invention uses regular size optical lenses. A regular lens is generally defined as a lens having a size greater than 1 mm. (b) Glockner's methods use a coherent light beam, while the present invention does not require that the light beam be coherent. Thus, the present invention is capable of using both coherent and incoherent light beams. (c) Glockner's methods are intended to directly provide a large angle deflection without needing another lens system for amplification, while the first embodiment of the present invention is an initial deflection subsystem, which must be followed by an deflection angle amplification lens system.

Note that although using microlens arrays can provide an appropriately large deflection angle for the light beam, the quality of the output light beam is generally rather poor. The reasons are two-fold. First, according to Glockner's method, in the microlens array, each microlens must use its full aperture for receiving and transmitting the light beam. This tends to severely degrade beam quality. Second, with present microlens array fabrication methods, the tolerance of each microlens is far inferior to the accuracy of regular size optical lenses. Thus, the accuracy of the surface curvature and the accuracy of focal length for each microlens in a lens array is generally rather poor and inconstant. As a result, the output beam divergence is large, and the resulting the beam direction resolution is poor.

The present invention employs regular lenses and piezoelectric actuators for light beam deflection. Regular optical lenses have a typical aperture or a focal length between 2 mm and 100 mm. In special cases, regular lenses, according to standard definitions, can be between 1 mm and, as large as, for example, 1 m. Because regular optical lenses have large apertures, the above-described diffraction problems can be reduced to be negligibility. As a result of the above differences, the output light beam can have a high beam quality.

2. Second Initial Beam Deflector Embodiment

Figure 4:
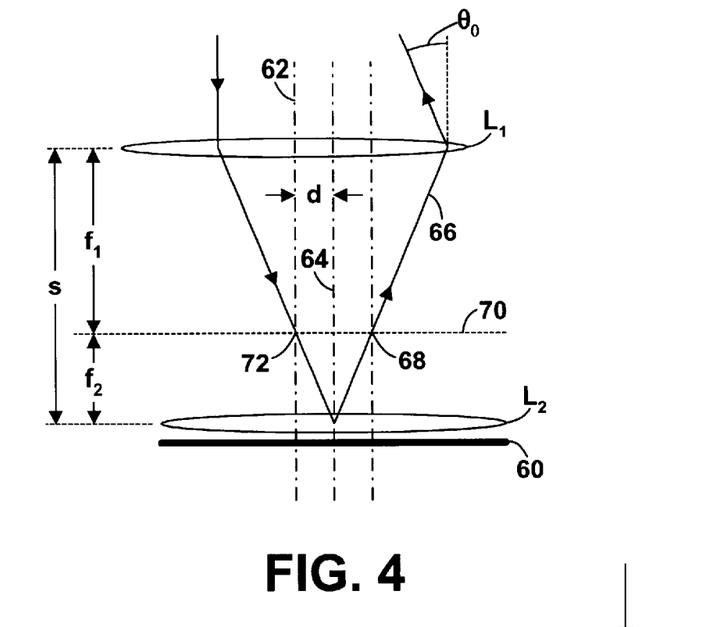
FIG. 4 is a schematic diagram of the second embodiment of the initial beam deflector in a deflecting state.

The second embodiment of the initial deflector 14, shown in FIG. 4, is essentially the same as the first embodiment except that a mirror 60 is placed close to the back surface of lens $L_2$. When the axis 62 of lens $L_1$ is displaced by a small distance d from light beam axis 64, the light beam at the back surface of lens $L_2$ is collimated and is reflected by the mirror 60. If there were no mirror, it would operate in the same manner as the first embodiment: the collimated light beam would propagate away from the back surface of lens $L_2$ with a small deflection angle $\theta_0=d/f_2$ where $f_2$ is the focal length of lens $L_2$. In this mirrored arrangement, however, the mirror 60 reflects the collimated light beam back, as at 66. The collimated light beam refocuses at the common focal plane 70 at a point 68 a distance $2d$ from lens $L_1$ focal point 72. Then the reflected light beam 66 passes through lens $L_1$ again and becomes collimated again with a deflection angle $\theta_0=(2d/f_2)\times(f_2/f_1)=2d/f_1$. If, for example, the focal length of lens $L_1$ is $f_1=3$ mm and the displacement of lens $L_1$ axis 62 from the optical axis 64 is d=100 μm, the initial deflection angle would be $\theta_0=2d/f_1=200/3,000=1/15$ radians $\approx 4°$.

3. Third Initial Beam Deflector Embodiment

Figure 5:
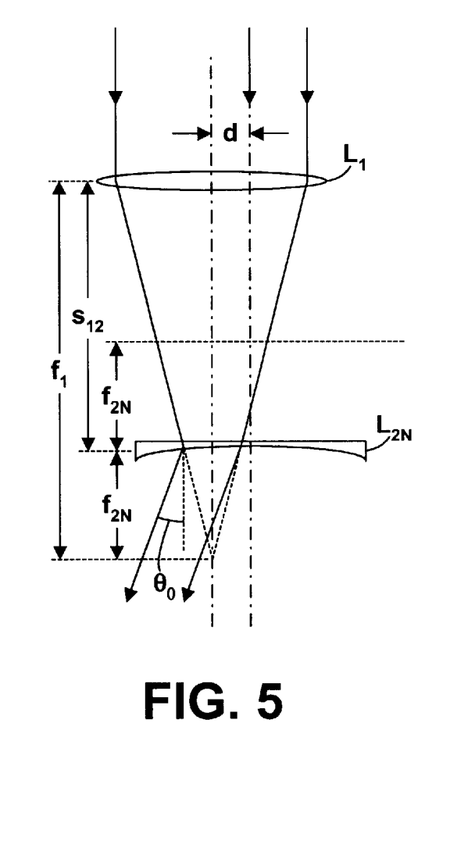
FIG. 5 is a schematic diagram of the third embodiment of the initial beam deflector in a deflecting state.

The third embodiment of the initial deflector 14, shown in FIG. 5, is essentially the same as the first embodiment except that positive lens $L_2$ is replaced by a negative lens $L_{2N}$. Because $f_1>0$ and $f_{2N}<0$, the distance between lens $L_1$ and lens $L_{2N}$ is $s_{12}=f_1-|f_{2N}|<f_1$.

The process and analysis and formulas for the deflection angle are the same as those described in the first embodiment above, except that $f_{2N}<0$. As a result, when lens $L_1$ is displaced by a small distance d from the optical axis 76, the initial deflection angle is angle $\theta_0=d/f_{2N}$.

While the operation principles are the same for the first and third embodiments, they each have different characteristics that may be advantageous in certain applications. For example, in the geometric configuration of the third embodiment, there exists no real focal point of the light beam. This may be advantageous if the power of the light beam is extremely high, as for use with a multi-watt laser beam or a high-brightness projection display.

4. Fourth Initial Beam Deflector Embodiment

Figure 6:
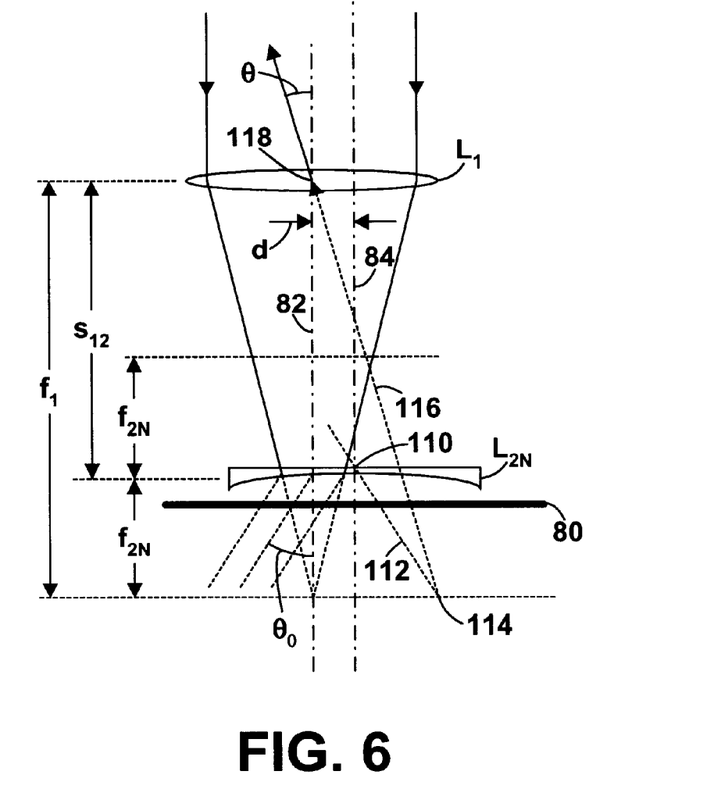
FIG. 6 is a schematic diagram of the fourth embodiment of the initial beam deflector in a deflecting state.

The fourth embodiment of the initial deflector 14, shown in FIG. 6, is essentially the same as the second embodiment except that a mirror 80 is placed close to the back surface of lens $L_{2N}$. When the axis 82 of lens $L_1$ is displaced by a small distance d from light beam axis 84, the light beam at the back surface of lens $L_{2N}$ is collimated and is reflected by the mirror 80. If there were no mirror, it would operate in the same manner as the third embodiment: the collimated light beam would propagate away from the back surface of lens $L_{2N}$ with a small deflection angle $\theta_0=d/f_2$ where $f_{2N}$ is the focal length of lens $L_{2N}$. In this mirrored arrangement, however, the mirror 80 reflects the collimated light beam back, as at 86.

The following graphical method can be used to determine the final angle of deflection $\theta_0$. First, at the center point 110 of lens $L_{2N}$ draw a line 112 for the reflected light beam direction before reaching through lens $L_1$. The reason for using the ray at the lens center 110 is based on the rule that a lens will not change the direction of a ray passing through the symmetrical center of lens. Although the mirror-reflected light does not have a real focus, it does have a virtual focus point 114. The accurate position of the virtual focus point 114 can be obtained because the mirror-reflected light ray 112 at the lens center point 110 must have an angle of $\theta_0=d/f_{2N}$. In addition, the line 112 must cross the focal plane of lens $L_1$ at the point 114. After the virtual focal point 114 is determined, draw a line 116 from point 114 to the symmetrical center 118 of lens $L_1$. This ray will not change direction after passing through lens $L_1$. Thus, the direction of the line 116 connecting the point 114 and the center 118 of lens $L_1$ determines the output light beam direction after the mirror-reflected light beam passes through lens $L_1$.

From the geometry of FIG. 6, it can be seen, that the output light beam angle will be $\theta_0=2d/f_{2N}$. It is also known that the light beam, after passing through lens $L_1$, will be a collimated beam. This is because distance $S_{12}=f_1+f_{2N}$ ($f_{2N}<0$). According to geometric optics formulae, the focal length $f_{12}$ of lens assembly $L_1+L_{2N}$ is $f_{12}=f_1 \times f_{2N}/(f_1+f_{2N}-S_{12})$. When $f_1+f_{2N}-S_{12}=0$, the focal length of lens assembly $L_1+L_{2N}$ is infinite. That is, when the incident light beam is collimated, the output light beam must be also collimated.

5. Fifth Initial Beam Deflector Embodiment

Figure 7:
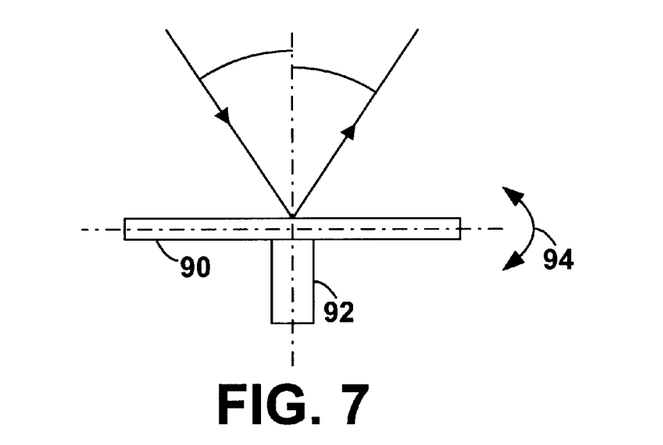
FIG. 7 is a schematic diagram of the fifth embodiment of the initial beam deflector.

The fifth embodiment of the initial beam deflector 14 comprises a mirror 90 and a piezoelectric actuator 92, shown schematically in FIG. 7. The mirror 90 is rigidly affixed to the actuator 92. The actuator 92, under control of electrical signals, tilts the mirror 90 in at least one angular dimension, as at 94, producing a change in the orientation of the mirror 90. The exact manner in which the actuator 92 produces that change in orientation of the mirror 90 is a matter of the specific design of the actuator 92. Such designs use standard mechanical mechanisms. Examples of such standard mechanical mechanisms can be found, for example, in the above-quoted U.S. patents and relevant journal articles.

The Beam Deflector Amplifier 16

The beam deflection amplifier 16 multiplies the small initial deflection angle $\theta_0$ by an amplification factor A to result in a full deflection angle $\theta_0 A=\theta$, where A>1. Typically, A will be constant for all values of $\theta_0$. However, the present invention contemplates that A may not be constant, but may be a function of the angle $\theta_0$ of the beam incident on the beam deflection amplifier 16. For example, A can be written as $A=A_1+A_2 \times f(\theta_0)$, where the $A_1$ and $A_2$ are constants with the relation $A_1>>A_2$, and $f(\theta_0)$ is a slowly changing function of $\theta_0$.

There are five preferred embodiments for the beam deflection amplifier 16.

1. First Beam Deflection Amplifier Embodiment

Figure 8:
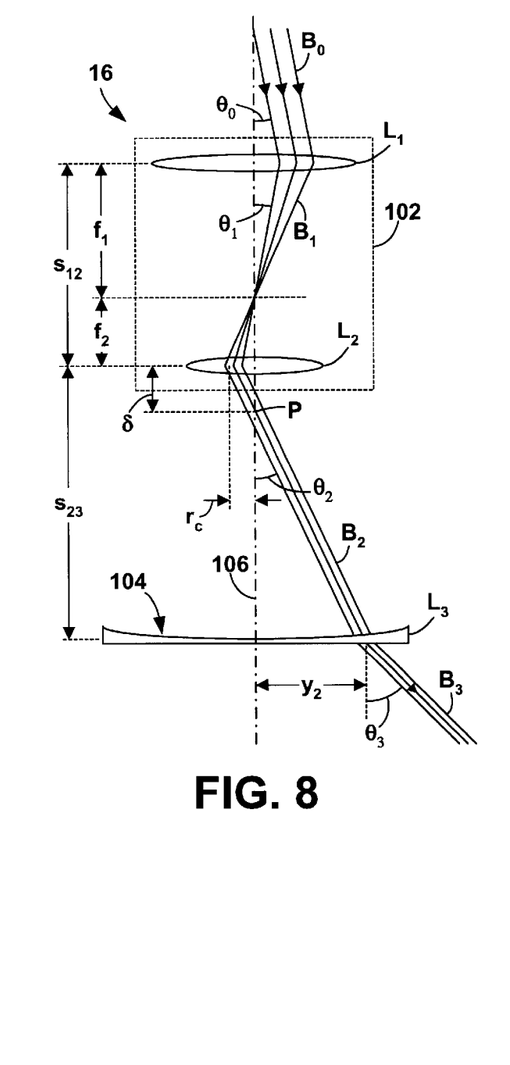
FIG. 8 is a schematic diagram of the first embodiment of the beam deflection amplifier.

The first preferred embodiment of the beam deflection amplifier 16 comprises two stages of amplification, as shown in FIG. 8. The first amplification stage 102 is essentially a Keplerian telescope lens system, which comprises a pair of positive lenses $L_1$ and $L_2$. The second amplification stage 104 is a negative lens system $L_3$ optically coupled to the first amplification stage 102. The most important criteria of the present invention for achieving a large output deflection angle at the output of the second amplification stage 104 is to make sure that the light beam $B_2$ always angles away from the optical axis 106 after crossing the optical axis 106 at point P. A characteristic feature of the lens system structure for the second stage amplification of the first embodiment is that the center line of the light beam $B_2$ crosses the optical axis 106 only once after leaving the surface of lens $L_2$.

The beam deflection amplifier 16 must simultaneously fulfill the following three requirements: (1) if a collimated beam enters the deflection amplifier, a collimated beam must exit the deflection amplifier; (2) the deflection angle of the output beam must be larger than the non-zero deflection angle of the input beam; and (3) the output beam must have good beam quality. In quantitative terms, the aberration of the output beam must be correctable to an acceptable value. The following is a description of how these requirements are fulfilled for each amplification stage.

As indicated above, the first amplification stage 102 is a Keplerian telescope lens system, which comprises essentially a pair of positive lenses, lens $L_1$ having a focal length $f_1$ and lens $L_2$ having a focal length $f_2$, where $f_1>f_2>0$. The two lenses are separated by a distance $s_{12}$ such that $f_1+f_2=s_{12}$. According to thin lens formulae, the focal length of the Keplerian telescope lens system is $f_{12}=f_1 \times f_2/(f_1+f_2-s_{12})$. Since $(f_1+f_2-s_{12})=0$, $f_{12}$ is infinite. Thus, the first amplification stage 102 meets the first two requirements: when a collimated light beam $B_0$ with a small deflection angle $\theta_0$ relative to the optical axis 106 is incident on lens $L_1$, the light beam $B_2$ from lens $L_2$ will also be collimated and will have a deflection angle $\theta_2$ relative to the optical axis 106 governed by the relationship $\tan(\theta_2/\theta_1)=\theta_2/\theta_1=f_1/f_2>1$. This is an established method for increasing the deflection angle of a light beam. However, two constraints on the Keplerian lens system limit the maximum output deflection angle. First, the amplification factor $A_{12}=f_1/f_2$ requires that $f_1>>f_2$. Generally this means that $f_1$ is on the order of 5 to 10 times larger than $f_2$. However, this ratio is limited by how large $L_1$ can be made and how small $L_2$ can be made.

And since the focal length $f_1$ is closely related to the curvature radius $r_1$ of lens $L_1$, the size of lens $L_2$ must be small. Additionally, in order keep aberrations within an acceptable range, the light beam $B_0$ must impinge upon only a small central area of $L_1$ with a radius value $r_c<<r_1$. Otherwise, the aberrations would be too large.

Note that it may be possible to improve this factor to some extent by inserting an additional lens called a "field lens" at the common focal plane of lens system $L_1+L_2$. The description of this standard procedure can be found in optics textbooks.

The second constraint is that the output light beam $B_2$ from lens $L_2$ must always cross the optical axis 106. At the maximum deflection angle, the output light beam must be bent from the edge of the central area at radius $r_c$ to the optic axis. The output deflection angle $\tan(\theta_2) \leq r_c/\delta$, where $r_c$ cannot be large and $\delta$ cannot be very small. Usually, the maximum deflection angle for a Keplerian lens system is only about 10° if a reasonable output light beam quality is required. Reducing the value $\delta$ and increasing the value $r_c$ tend to exponentially increase aberration, drastically degrading light beam quality.

In prior art, there is no effective procedure for improving this constraint. The only improvement in prior art is the use of a compound positive lens to replace the single positive lens $L_2$. However, the improvement is very much limited because the fundamental lens aberration relationship determines that the aberration increases at least as the third power of the value of ratio $(r_c/\delta)$. In order to increase the maximum output angle $\theta_2$ (and $\tan(\theta_2)$), one has to increase the ratio $(r_c/\delta)$. But a slight increase of the ratio $(r_c/\delta)$ leads to a drastic increase in the aberration and degradation of the beam quality. On the other hand, it should be mentioned that, in reality, the small value for the maximum deflection angle is not a serious problem for the Keplerian lens system when used as a telescope, because for the observation of a remote scene through human eyes does not require a very large deflection angle. However, for many modern optical systems, such as for use with the present invention, the small maximum output deflection angle is often unacceptable. To solve this problem, the present invention introduces a second stage of amplification.

The basic approach to the second stage of amplification is that, after the beam $B_2$ has crossed the optical axis 106 at the point P, it is always angling away from optical axis 106, so beam $B_2$ does not cross the optical axis 106 more than once.

For quantitative analysis, note that, because $f_1 \gg f_2$, the output light beam $B_2$ from lens $L_2$ is narrow. Because it is narrow, light beam $B_2$ can be represented by its center ray emitted from point P. A negative lens $L_3$ with a focal length $f_3<0$ and located at distance $s_{23}$ from $L_2$ tends to angle the beam $B_3$ outwardly by an additional slope of $\Delta u_{23}=u_3-u_2=\tan(\theta_3)-\tan(\theta_2)$, where u is the slope of the corresponding beam relative to the optical axis 106. As shown in FIG. 6, as a first order approximation, according to paraxial ray tracing theory, $\Delta u_{23}=\tan(\theta_3)-\tan(\theta_2)=y_2/f_3$, where $y_2$ is the height of the beam $B_2$. Since $y_2=u_3 \times s_{23}$, the amplification factor of the second stage $A_3=s_{23}/f_3$. As long as the distance $s_{23}$ is sufficiently large and lens $L_3$ is constructed with an appropriately large size, the amplification factor can range between approximately 2 and 10 and the output deflection angle can be as large as 90°.

In addition to the requirement that the lens system provide amplification, it is also necessary that the lens system output a beam with good beam quality. If the beam $B_2$ from lens $L_2$ is a collimated beam, the output beam $B_3$ will be divergent due to the negative lens $L_3$. By appropriately choosing the parameters $f_2$, $f_3$, $s_{23}$, and fine-tuning the distance $s_{12}$, all the required performance parameters can be consistently achieved. To show that this is true, consider lens pair $L_3+L_2$ and look into lens $L_3$ in the reverse direction, that is, from the output. When using thin lens approximations, the combined back focal length $bfl_{23}$ for lens pair $L_3+L_2$ is $bfl_{32}=f_2 \times (f_3-s_{23})/(f_2+f_3-s_{23})$. The back focal length $bfl_{32}$ is defined as the distance from the back surface of lens $L_2$ (the "back surface" of lens $L_2$ is the surface of lens $L_2$ on the $L_1$ side) to the focal point of lens system $L_3+L_2$ along the direction from $L_3$ to $L_2$. If $f_2>0$, $f_3=-m_3 \times f_2<0$, where $m_3$ is an integer between 1 and 5, inclusive, and $s_{23}=-m_s \times f_3=m_s \times m_3 \times f_2$, where $m_s$ is an integer between 1 and 5, then the back focal length $bfl_{23}=f_2 \times (m_3+m_s \times m_3)/(m_3+m_s \times m_3-1)$. Use of integer parameters $m_3$ and $m_s$ here is only for convenience in order to express the values $s_{23}$ and $f_3$ through $f_2$. The integer parameters $m_3$ and ms can vary in a range to meet different amplification requirements. Taking $m_3=3$ and $m_s=3$, the back focal length would be $bfl_{23}=f_2 \times 12/11$, only slightly longer than $f_2$. Thus, according to the above analysis under thin lens approximation, in order to maintain a collimated output light beam $B_3$, only distance $s_{12}$ needs to be fine-tuned. For the first amplification stage 102 to work properly, it is required that the distance from the focal point of lens $L_1$ to the surface of lens $L_2$ be $f_2$ or, equivalently, $s_{12}=f_1+f_2$. For the second amplification stage 104 to work properly, as above analysis shows, the distance from the focal point of lens $L_1$ to the surface of lens $L_2$ must be $bfl_{23}=f_2 \times 12/11$, which is $f_2 \times 1/11$ larger than the above defined distance $s_{12}$. To ensure that both amplification stages work properly, the distance between lenses $L_1$ and $L_2$ can be adjusted to a new value of $ss_{12}$, so that $ss_{12}=(f_2+f_1)+f_2 \times 1/11$. The final result would be that the first amplification stage 102 provides the same amplification factor for beam deflection, with a slight difference from the standard Keplerian telescope in that the output light beam from lens $L_2$ is not exactly a collimated beam, but is slightly converging. The slightly converging light beam $B_2$ from lens $L_2$, after passing through negative lens system $L_3$, becomes accurately collimated. Therefore, the second stage amplification 104, as described above, can provide both appreciable amplification value and a high quality output light beam $B_3$. The closely coupled two-stage amplification lens system ensures that the two conditions can be simultaneously satisfied.

The above data shows that the three-lens system $L_1+L_2+L_3$ can provide a large amplification $A=A_{12} \times A_3 = (f_2/f_1) \times (s_{23}/f_3)$ and a collimated output beam $B_3$. The maximum output deflection angle can closely approach ±90°. For example, when the initial deflection angle is ±1°, $A_3=(f_2/f_1)=10$, and $(s_{23}/f_3)=6$, the output deflection angle is ±60°. Thus, through the above-described two-stage amplification, the maximum output deflection angle can far exceed the capability of classical telescope lens systems.

Figure 9:
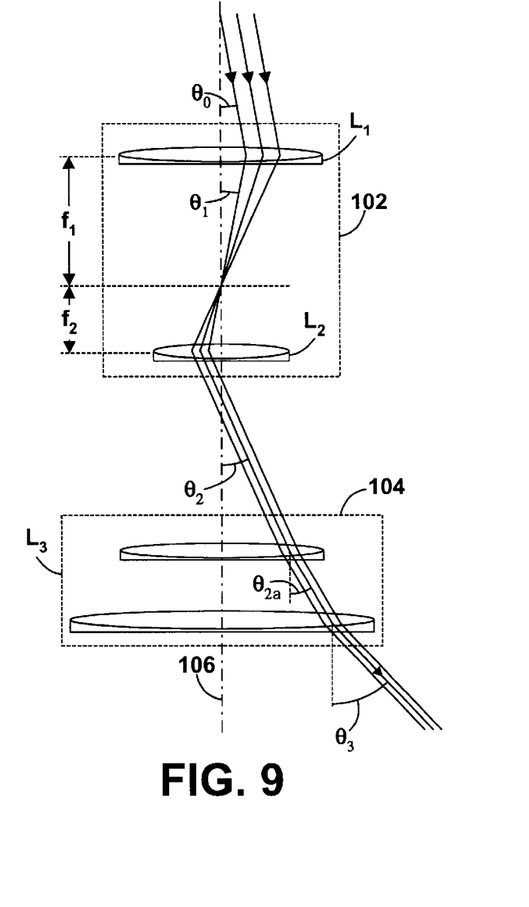
FIG. 9 is a schematic diagram of the embodiment of FIG. 8 with enhancement.

Note that the beam deflection amplifier of FIG. 8 has only a single negative lens $L_3$ coupled with the positive lens $L_2$. This represents only the most basic configuration of the deflection amplifier. In practical systems, a number of lenses can be used as a lens assembly, as long as the basic characteristic of the negative lens is maintained. As described above, the basic characteristic is that, after beam $B_2$ is emitted from lens $L_2$, it does not cross the optical axis more than once. As shown in FIG. 9, the second amplification lens assembly 104 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. When using an optimized lens assembly for the second amplifier stage 104, the output deflection angle can closely approach ±90°.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

2. Second Beam Deflection Amplifier Embodiment

Figure 10:
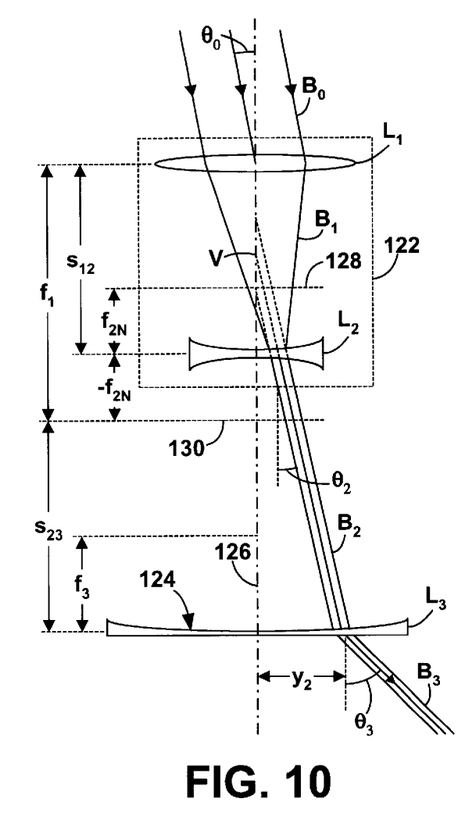
FIG. 10 is a schematic diagram of the second embodiment of the beam deflection amplifier.

The second preferred embodiment of the beam deflection amplifier 16 also comprises two stages of amplification, as shown in FIG. 10. The first amplification stage 122 is essentially a Galilean telescope lens system. The second amplification stage 124 is a negative lens system optically coupled to the first amplification stage 122. As with the first embodiment above, the most important criteria of the present invention for achieving a large output deflection angle at the output of the second amplification stage 124 is to make sure that the light beam $B_2$ always angles away from the optical axis 126. In simple and unified mathematical terms, the slope of the light beam u remains that same or increases relative to the optical axis 126 throughout the second amplification stage 124.

A Galilean lens system comprises essentially a pair of lenses, lens $L_1$ having a positive focal length $f_1>0$ and lens $L_2$ having a negative focal length $f_2<0$, where $f_1>|f_2|$. The two lenses are separated by a distance $s_{12}$ so that $f_1+f_2=s_{12}$. When a collimated light beam with a small deflection angle $\theta_0$ relative to the optical axis 126 is incident on lens $L_1$, the output light beam $B_2$ from lens $L_2$ will have a larger deflection angle $\theta_2$ relative to the optical axis 124, where $\theta_2/\theta_0=f_2/|f_1|>1$. This is an established, well-known method for increasing the deflection angle of a light beam. The limitation of this lens system $L_1+L_2$ is that the maximum output deflection angle cannot be large because the radius $r_2$ of lens $L_2$ must be small. In addition, the light beam must only impinge on a limited central area with a radius $r_c<r_2$, otherwise lens aberrations would be unacceptable relative to that of lens $L_1$. Keeping the light beam inside the area $r_c$ means that the output deflection will be very limited. This corresponds to the same limitation discussed above relative to the Keplerian lens system of the first embodiment. Note that the Galilean lens system intrinsically does not permit insertion of a field lens. Thus, this limitation cannot be overcome and the prior art contains no effective method for improving this limitation. As a result, the Galilean lens system is usually considered inferior to the Keplerian lens system because the maximum deflection angle for a Galilean lens system is less than that of the Keplerian system.

The present invention provides an effective method for significantly improving the maximum deflection angle of the Galilean lens system when used for light beam deflection to meet the requirements of modern optics. The basic method is to add a second stage of amplification. The following shows that a two-stage deflection angle amplifier provides a large output deflection angle with good output beam quality. The basic construction and analysis are the same as those described above for the Keplerian lens system of the first embodiment. The difference is that the positive lens $L_2$ is replaced with a lens $L_{2N}$ having a negative focal length $f_{2N}$, and the corresponding geometric configuration is modified for the negative lens.

Because lens $L_{2N}$ has a negative focal length, its focal plane 128 for forward light beam propagation (from lens $L_1$ to lens $L_{2N}$ to lens $L_3$) is located between lenses $L_1$ and $L_{2N}$. This is also the common focal plane of lens system $L_1+L_{2N}$. Because $f_1>>|f_{2N}|$, the output light beam $B_2$ from lens $L_2$ is also a narrow beam as in the case of Keplerian system. Since the width of the beam $B_2$ is small, the output beam $B_2$ from lens $L_{2N}$ can be approximately described as a ray that is emitted from the optical axis 124 at point V. The behavior of beam $B_2$ passing through the second stage lens $L_3$ can be calculated by paraxial ray formulae. According to the paraxial approximation, a negative lens with a focal length $f_3$, located at distance $s_{23}$ tends to bend the ray trace outwardly by an additional slope of $\Delta u_{23}=u_3-u_2=\tan(\theta_3)-\tan(\theta_2)=y_2/f_3$, where $y_3$ is the height of the beam $B_2$. Since $y_2=u_3\times s_{23}$, the amplification factor of the second stage is $A_3=s_{23}/f_3$. As long as the distance $s_{23}$ is sufficiently large and lens $L_3$ is constructed with an appropriately large size, the amplification factor can range from about 2 to about 10, and the output deflection angle can be as large as ±90°.

In addition to the requirement that the lens system provide amplification, it is also necessary that it provide a collimated light beam output. If beam $B_3$ is a collimated beam, it will diverge from the optical axis 126 because lens $L_3$ is negative. By appropriately choosing the parameters $f_2$, $f_3$, $s_{23}$, and fine-tuning the distance $s_{12}$, all the required performance parameters can be consistently achieved. To show this, consider lens pair $L_3+L_{2N}$ looking from the reverse direction of light propagation, that is, from the output surface of lens $L_3$ along the direction $L_3$ to $L_{2N}$ to $L_1$. When using thin lens approximations, the combined back focal length $bfl_{23}$ for lens pair $L_3+L_{2N}$ is $bfl_{23}=f_2\times(f_3-s_{23})/(f_2+f_3-s_{23})$. If $f_2>0$, $f_3=-m_3\times f_2<0$, where $m_3$ is an integer between 1 and 5, inclusive, and $s_{23}=-m_s\times f_3=m_s\times m_3\times f_2$, where $m_s$ is an integer between 1 and 5, inclusive, then the back focal length $bfl_{23}=f_2\times(m_3+m_s\times m_3)/(m_3+m_s\times m_3+1)$. The integer parameters $m_3$ and $m_s$ can vary in a broad range to meet different amplification requirements. For example, when $m_3=3$ and $m_s=3$, the back focal length would be $bfl_{23}=f_2\times 12/13$. Because $f_2<0$, the absolute value $|bfl_{23}|$ is only slightly smaller than $|f_2|$. The back focal length is the distance from the back surface of the back lens to the focal point of the lens system. A negative back focal length represents the fact that the focal plane position is located between lenses $L_{2N}$ and $L_3$ instead of outside of the lens pair. Actually, the above data shows that the focal plane of lens system $L_{2N}+L_3$ is located close to the focal plane 130 of lens $L_1$. Thus, in order to keep the output beam $B_3$ collimated, only a minor change to $s_{12}$ needs to be made that does not significantly affect system parameters. Specifically, $s_{12}$ only needs to be decreased from the original design value $s_{12}=f_2+f_1$, where $f_2<<f_1$, by the amount $1/12\times f_2$. This small decrease of $s_{12}$ has no significant adverse impact on any other system characteristics.

This analysis shows that the three-lens system $L_1+L_{2N}+L_3$ provides a lens system with a large amplification $A=K_{12}\times K_3=(f_2/f_1)\times(s_{23}/f_3)$ with a collimated output beam.

Note that the beam deflection amplifier as shown in FIG. 10 only has one single negative lens $L_3$ coupled with the positive lens $L_2$. This represents only the most basic configuration of the amplifier. In practical systems, a number of lenses can be used as a lens assembly, as long as the basic characteristic of the negative lens in the second embodiment is maintained. The basic feature of the second amplification stage 124 in the second embodiment is, as described above, after beam $B_2$ is emitted from lens $L_2$, it does not cross the optical axis 126. This differs from the first embodiment, where once beam $B_2$ is emitted from lens $L_2$, it crosses the optical axis only once.

Figure 11:
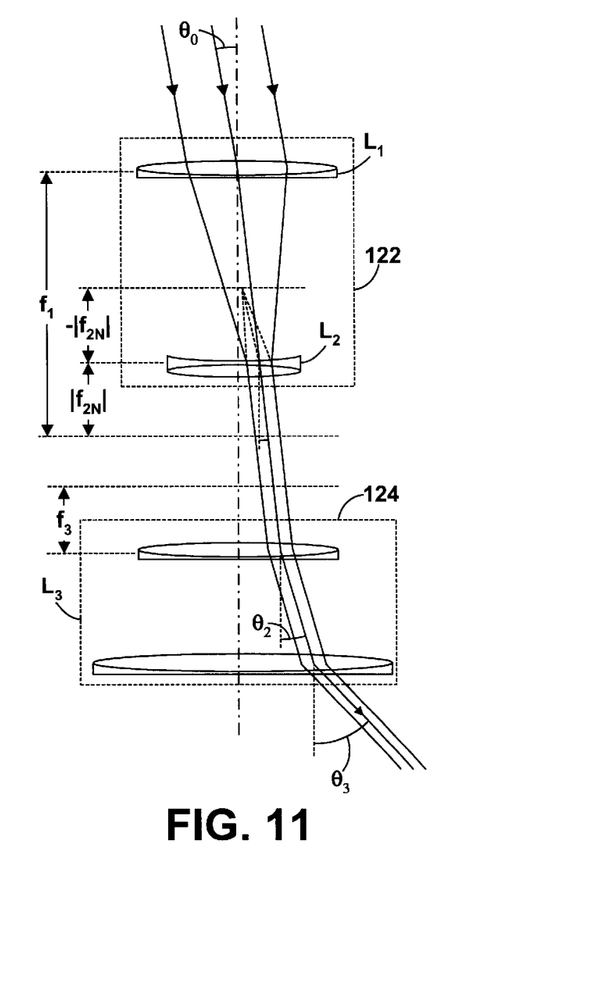
FIG. 11 is a schematic diagram of the embodiment of FIG. 10 with enhancement.

As shown in FIG. 11, the second amplification lens assembly 124 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. When using an optimized lens assembly for the second amplifier stage 104, the output deflection angle can closely approach $\pm 90°$.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

3. Third Beam Deflection Amplifier Embodiment

Figure 12:
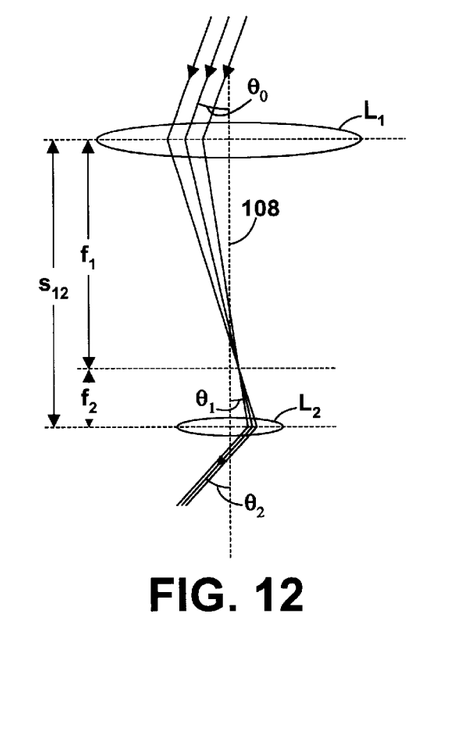
FIG. 12 is a schematic diagram of the third embodiment of the beam deflection amplifier.

The third preferred embodiment of the beam deflection amplifier 16 is to use a standard telescope lens system. A standard telescope lens system comprises two lenses with different focal lengths. One lens is objective, the other is an eyepiece. The amplification is basically determined by the ratio of the focal length of the two lenses, as described in standard optics texts. There are two types of telescope lens systems the perform the same function for amplification of deflection angle, Keplerian and Galilean telescope lens systems. While the Keplerian telescope is used as an example for description, the principles and conclusions are equally applicable to both. As shown in FIG. 12, the Keplerian telescope lens system comprises essentially a pair of positive lenses, lens $L_1$ having a focal length $f_1$ and lens $L_2$ having a focal length $f_2$, where $f_1 > f_2 > 0$. The two lenses are separated by a distance $s_{12}$ such that $f_1 + f_2 = s_{12}$. According to thin lens formulae, the focal length of the Keplerian telescope lens system is $f_{12} = f_1 \times f_2/(f_1 + f_2 s_{12})$. Since $(f_1 + f_2 - s_{12}) = 0$, $f_{12}$ is infinite. Thus, the lens system meets the first two requirements of the deflection angle amplifier: when a collimated light beam $B_0$ with a small deflection angle $\theta_0$ relative to the optical axis 108 is incident on the lens $L_1$, the light beam $B_2$ from the lens $L_2$ will also be collimated and will have a deflection angle $\theta_2$ relative to the optical axis 108 governed by the relationship $\tan(\theta_2/\theta_1) = \theta_2/\theta_1 = f_1/f_2 > 1$. This is an established method for increasing the deflection angle of a light beam.

A typical value for deflection angle amplification through use of standard telescope system is 10, and with a maximum output deflection angle approximately $10°$ with an input deflection angle of $1°$.

4. Fourth Beam Deflection Amplifier Embodiment

Figure 13:
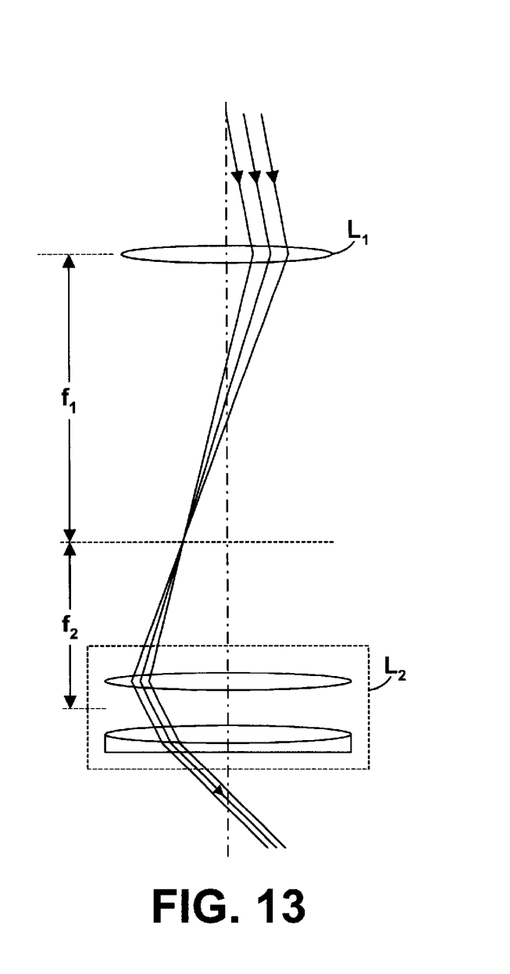
FIG. 13 is a schematic diagram of the fourth embodiment of the beam deflection amplifier.

The fourth preferred embodiment of the beam deflection amplifier 16 is to use a compound lens system as lens $L_2$. A number of such improved structures for the second lens $L_2$ have been available. Examples include the Huigenian eyepiece and Ramsden eyepiece, each having 2 lens elements, the Kellner eyepiece and RKE eyepiece, each having 3 lens elements, the Orthoscopic eyepiece and Plossl eyepiece, each having 4 lens elements, and the Erfle eyepiece having 5 or 6 lens elements. These lens systems with a compound focusing lens structure can improve the maximum output deflection angle to some extent. For example, when the beam quality requirements are high, that is, the acceptable beam divergence, chromatic aberration, distortion are very low, a typical value of $15°$ for maximum output deflection angle can be achieved through use of compound lens systems. When beam quality requirements are low enough, a maximum output deflection angle of $20°$ can be provided.

The fourth embodiment of the deflection angle amplifier using a compound lens RKE eyepiece with 3 lens elements as the output lens $L_2$ is shown in FIG. 13.

5. Fifth Beam Deflection Amplifier Embodiment

The fifth preferred embodiment of the beam deflection amplifier 16 is the lens system as disclosed in the U.S. patent application Ser. No. 09/503,828. The lens system disclosed in U.S. patent application Ser. No. 09/503,828 can provide an output deflection angle approaching $\pm 90°$, essentially covering an entire half-space.

Note that the present invention contemplates some variations to the above described embodiments based on standard practices with optical devices. Generally, in an optical system designed for executing a specific function, accessory optical components may be inserted in order the enhance system performance without changing the basic function of the system. These accessories can include, for example, mirrors, prisms, beam splitters, field lenses, relay lenses, coatings, etc.

What is claimed is:

1. A light beam deflector adapted for deflecting a source light beam emitted from a light source, said deflector having an optical axis and comprising:

(a) in physical order, an initial beam deflector and a beam deflection amplifier;

(b) said initial beam deflector receiving said source light beam and emitting an initially deflected light beam at an initial deflection angle $\theta_0$;

(c) said initial beam deflector including at least one piezoelectric actuator for controlling said initial deflection angle $\theta_0$;

(d) said beam deflection amplifier having a deflection angle amplification factor $A > 1$; and (e) said beam deflection amplifier receiving said initially deflected light beam and transmitting a fully deflected light beam at a full deflection angle $\theta = A\theta_0$.

2. The light beam deflector of claim 1 wherein said initial beam deflector includes, in physical order, a first lens and a second lens, each of said lenses having an optical axis, said optical axes being parallel, one of said lenses being affixed to said at least one piezoelectric actuator such that said at least one piezoelectric actuator can move said affixed lens in at least one dimension.

3. The light beam deflector of claim 2 wherein said lens are positive lenses.

4. The light beam deflector of claim 2 wherein said first lens is a positive lens and said second lens is a negative lens.

5. The light beam deflector of claim 2 wherein said initial beam deflector includes a mirror, wherein said second lens is between said first lens and said mirror.

6. The light beam deflector of claim 2 wherein said lens optical axes are parallel to said deflector optical axis.

7. The light beam deflector of claim 1 wherein said initial beam deflector includes a mirror affixed to said at least one piezoelectric actuator such that said at least one piezoelectric actuator can tilt said mirror in at least one angular dimension.

8. The light beam deflector of claim 1 wherein said beam deflection amplifier includes a first amplification stage and a second amplification stage, said second amplification stage including a negative lens.

9. The light beam deflector of claim 8 wherein said beam deflection amplifier first amplification stage includes at least two positive lenses.

10. The light beam deflector of claim 8 wherein said beam deflection amplifier first amplification stage includes, in physical order, a positive lens and a negative lens.

11. The light beam deflector of claim 1 wherein said amplification factor A is a constant.

12. The light beam deflector of claim 1 wherein said amplification factor A is a function of said initial deflection angle $\theta_0$.

* * * * *